United States Patent [19]

Stranghöner et al.

[11] Patent Number: 4,851,460

[45] Date of Patent: Jul. 25, 1989

[54] AQUEOUS COATING COMPOSITION, PROCESS FOR ITS PREPARATION AND ITS USE

[75] Inventors: Dieter Stranghöner, Sprokhovel; Hans-Peter Patzschke; Christa Lühmann, both of Wuppertal, all of Fed. Rep. of Germany

[73] Assignee: Herberts Gesellschaft mit Beschrankter Haftung, Wuppertal, Fed. Rep. of Germany

[21] Appl. No.: 86,717

[22] Filed: Aug. 18, 1987

[30] Foreign Application Priority Data

Aug. 19, 1986 [DE] Fed. Rep. of Germany ....... 3628124

[51] Int. Cl.$^4$ ...................... C08L 51/08; C08L 75/04; C08L 63/10
[52] U.S. Cl. .................................. 523/407; 523/415; 523/416; 523/423
[58] Field of Search ............... 523/423, 407, 415, 416; 525/454

[56] References Cited

U.S. PATENT DOCUMENTS

| | | | |
|---|---|---|---|
| 4,240,938 | 12/1980 | Kraft | 524/109 |
| 4,482,671 | 11/1984 | Woo | 523/407 |
| 4,564,648 | 1/1986 | Huybrechts | 523/407 |

FOREIGN PATENT DOCUMENTS

| | | |
|---|---|---|
| 1953348 | 5/1971 | Fed. Rep. of Germany . |
| 2363307 | 10/1974 | Fed. Rep. of Germany . |
| 2811913 | 2/1980 | Fed. Rep. of Germany . |
| 3128025 | 2/1983 | Fed. Rep. of Germany . |
| 3128062 | 2/1983 | Fed. Rep. of Germany . |
| 3301729 | 7/1984 | Fed. Rep. of Germany . |

*Primary Examiner*—C. Warren Ivy
*Attorney, Agent, or Firm*—Michael O. Warnecke; Donald A. Peterson

[57] ABSTRACT

An aqueous coating composition is described, containing, as binder, a mixture of (A) 50 to 95% by weight of a reaction product of a carboxy functional polycondensate containing epoxy groups, at least one copolymerisable o,-olefinically unsaturated monomer and conventional auxiliary agents, and (B) 50 to 5% by weight of a polyurethane dispersion, optionally together with a grinding resin. The process for the preparation of the aqueous coating compound and its use for the formation of coatings are also described.

10 Claims, No Drawings

AQUEOUS COATING COMPOSITION, PROCESS FOR ITS PREPARATION AND ITS USE

BACKGROUND OF THE INVENTION

1. Field Of The Invention

This invention relates to an aqueous coating composition containing a film forming material based on a reaction product of carboxy functional polycondensates and α,β- olefinically unsaturated monomers together with a polyurethane dispersion and optionally grinding resins and/or grinding auxiliaries.

2. Description Of The Prior Art

Coating compositions containing reactive polymer dispersions are described in DE-OS No. 3 128 025 and DE-OS No. 2 128 062. They give rise to weather-resistant coatings but show insufficient adhesion when used in multilayered lacquers.

Carboxy-functional self-curing polymers which additionally contain epoxy groups, for example prepared according to DE-OS No. 2 811 918, give rise to firmly adhering coatings when used in combination with melamine resins in metallic base coat formulations (according to DE-OS No. 3 301 729) but these coatings have undesirable properties, for example with regard to their storage in water. This applies in particular to the build-up of lacquers under so-called repair conditions in which additional layers of lacquer are applied to already previously lacquered surfaces at low curing temperatures. The polymers mentioned, however, do not have satisfactory flow properties even when thickeners are added.

When used in combination with reactive melamine resins in aqueous metallic basecoat coatings, mixtures of polymer dispersions, e.g. of the kind described in the above-mentioned DE-OS Nos. 3 128 025 and 3 128 062, with the above-mentioned self-curing polymers do not provide any improvement in the desired combination of properties of adherence to intermediate layers and stability in water. On the contrary, a combination of poor interlayer adherence and insufficient storage stability in water generally occurs. Moreover, this mixture cannot be sufficiently thickened with the usual thickeners based on polyacrylates. polyethylene oxide, polyvinyl alcohols, cellulose ethers and others.

SUMMARY OF THE INVENTION

It is an object of the present invention to prepare an aqueous coating composition which has excellent adherence to different substrates and good leveling and which gives rise to coatings with a smooth surface and have suitable properties for application. In particular, such a coating compound is intended to be suitable for metallic basecoats and result in good alignment of metallic or non-metallic effect pigments.

The problems of the prior art are solved by the aqueous coating compositions according to the invention, which contain a film forming material based on an aqueous dispersion of water dilutable binders in addition to pigments (coloring pigments and/or metallic and/or nonmetallic effect pigments).

More particularly the invention broadly comprises an aqueous coating composition described, containing, as binder, a mixture of (A) 50 to 95% by weight of a reaction product of a carboxy functional polycondensate containing epoxy groups, at least one copolymerisable o,-olefinically unsaturated monomer and conventional auxiliary agents, and (B) 50 to 5% by weight of a polyurethane dispersion, optionally together with a grinding resin. The invention also includes a process for the preparation of the aqueous coating compound and its use for the formation of coatings, and coated objects made therewith.

DETAILED DESCRIPTION OF THE INVENTION

The binders of the invention comprise a mixture of
(A) 50 to 95% by weight of a reaction product of
 (a) 5 to 95% by weight of a carboxy functional polycondensate which in addition contains epoxy groups,
 (b) 95 to 5% by weight of at least one copolymerisable α,β-olefinically unsaturated monomer and
 (c) 0 to 20% by weight of conventional auxiliary substances for the preparation of polymers, the quantities indicated of components a) to c) being based on the solids content of component A and their sum being in all cases 100% by weight;
(B) 50 to 5% by weight of polyurethane dispersion; and
(C) 0 to 20% by weight of grinding resin and/or grinding agent, the proportions of (A), (B) and (C) being based on the solids content and their sum being in all cases 100%.

In the above described binder compositions, Component B is preferably a polyurethane dispersion containing urea groups.

Component A used in the aqueous coating composition of the invention may be prepared by free radical emulsion polymerization of:
 (a) 5 to 95% by weight of a carboxy functional polymer in the form of an aqueous system with
 (b) 95 to 5% by weight of at least one copolymerisable α,β-olefinically unsaturated monomer in the presence of
 (c) 0 to 20% by weight of anionic or non-ionic emulsifiers, or a mixture of the two, or of protective colloids, based on the solids content of components a) to c), with the addition of from 0.01 to 10% by weight of at least one polymerization initiator, based on the monomer content of b) in the presence of other conventional additives, at a temperature from 0° to 150° C.

The polymer properties can be adjusted within wide limits by suitable choice of the starting materials. For example, polymers which are soluble or dispersible in water may be prepared by the polymerization of vinyl monomers which have no cross-linking action in the aqueous dispersion or solution of an uncross-linked, self-curing carboxy functional polymer. In such a procedure, the hydrophilic or hydrophobic properties and the hardness and flexibility, for example, may be adjusted as required by suitable choice of components (a) and (b). Furthermore, polymers capable of being dispersed in water may first be prepared by the incorporation of reactive vinyl monomers, and these dispersible polymers may then be converted into the cross-linked state by a suitable after-treatment, preferably after their application to a substrate.

Suitable polycondensates of component a) are prepared in known manner according to DE-OS No. 2 811 913 by the reaction of a) halogen-free polycarboxylic acid units, β) salt-forming substances from the group of alkali metals, alkaline earth metals, quaternary ammonium salts, organic bases and/or ammonia, γ) polymers containing OH groups and having an OH number of from 20 to 150 and/or γ') epoxide compounds, followed by solution and/or dispersion in water. The polymers contain at least 3 of the 4 units mentioned. The molecular weight average $\overline{M}_w$ of such compounds is in the range of from 2000 to 100,000, preferably from 6000 to 50,000 (gel chromatography, polystyrene standard).

The α,β-olefinically unsaturated monomers used as component b) may be virtually any free radically polymerisable monomers but with the usual restrictions for copolymerisations as laid down by the Q- and e-scheme of Alfrey and Price and prescribed by the copolymerization parameters (see e.g. Brandrup. Immergut. Polymer Handbook, 2nd ed. (1975) John Wiley and Son, New York).

The following are examples of suitable α,β-olefinically unsaturated monomers: (Meth)acrylate monomers such as methyl (meth)acrylate, ethyl (meth)acrylate, propyl (meth)acrylate, the various isomeric butyl (meth)acrylates, isomeric octyl (meth)acrylates. e.g. 2-ethylhexyl (meth)-acrylate, (meth)acrylamide, N-methylol (meth)acrylamide, (meth)acrylonitrile and (meth)acrylic acid itself. vinyl aromatic monomers such as styrene, o-methylstyrene, vinyl toluene and vinyl pyridine, vinyl ester monomers such as vinyl acetate, vinyl esters of branched ($C_9$–$C_{12}$)-carboxylic acids such as versatic acid vinyl ester: linoleic acid vinyl esters, esters, semiesters. Amides and semiamides of α,β-ethylenically unsaturated mono- and di-carboxylic acids such as crotonic acid, maleic acid, fumaric acid and sorbic acid, monomeric unsaturated halogen compounds such as vinyl chloride, vinylidene chloride, (meth)acrylic esters of partially and/or completely fluorinated alcohols corresponding to the general formula

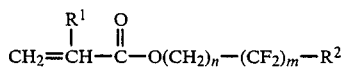

wherein $R^1$=H or $CH_3$, $R^2$=H or F, n=0–10 and m=0–25, hexafluoropropylene, perfluorohexylethylene, 2-hydroperfluoroethyl allyl ether and 2-hydroperfluoropropyl allyl ether, and monomers of the type of ethylenically multiunsaturated, preferably di- to tri-unsaturated compounds such as divinyl benzene, ethanediol di(meth)acrylate, propanediol di(meth)acrylate, butanediol di-(meth)acrylate, hexanediol di(meth)acrylate, glycero tri(meth)acrylate, pentaerythritol tri(meth)acrylate and diallylphthalate. When ethylenically multiunsaturated monomers are used, their quantity generally amounts to 0.01 to 20% by weight, based on the total quantity of the monomer b).

Monomers with functional groups may also be used, e.g. monomers with chemical groups which can lead to cross-linking in the applied lacquer, such as carboxylic acid, sulphonic acid, hydroxyl, amino, amido, keto, aldehyde, lactame, lactone, isocyanate and epoxy groups. Cocondensible and copolymerisable monomers containing such functional groups are known.

The use of hydrophilic monomers is possible but generally not necessary for carrying out the polymerizations according to the invention.

Examples of suitable monomers carrying carboxylic acid groups include α,β-ethylenically unsaturated mono- and dicarboxylic acids such as crotonic acid, sorbic acid, itaconic acid, fumaric acid, maleic acid, maleic acid semiesters and the semiesters of itaconic and fumaric acid, but acrylic and methacrylic acid are preferred.

Unsaturated monomers containing suitable epoxide groups for cross-linking include unsaturated glycidyl esters and ethers, e.g. glycidyl methacrylate, glycidyl acrylate, allylglycidyl ethers, allylglycidyl (meth)acrylate such as methyl glycidyl (meth)acrylate, glycidyl and alkylglycidyl (meth)acrylamide and monoalkyl glycidyl fumaric acid esters such as monobutyl glycidyl fumaric acid ester.

Other copolymerisable monomers include monomers with blocked isocyanate groups, such as blocked (e.g. with caprolactam) isocyanatoethyl (meth)acrylate and aminoalkyl compounds such as dimethylaminoethyl (meth)acrylate and tert.-butyl aminoethyl (meth)acrylate, N-alkoxyalkylamides such as methoxy or ethoxy methyl (meth)acrylamide, hydroxyalkyl esters such as hydroxyethyl and hydroxypropyl (meth)acrylate, and the corresponding compounds of the above-mentioned (meth)acrylic acid derivatives of other ethylenically unsaturated acids such as maleic , fumaric, itaconic, crotonic and sorbic acid.

The proportions of components (a) and (b) may vary within wide limits depending on whether soft or hard and optionally flexible polymer properties are required. Preferably, 10 to 90% by weight of component (a) are reacted with 90 to 10% by weight of the monomers (b), these proportions being based on the total solids content of the components.

Preferred dispersion copolymers may contain as monomer units, based on the quantity of component (b), up to 100% by weight of methyl methacrylate and/or n-butyl acrylate, 0 to 20% by weight of hydroxyethyl methacrylate, 0 to 20% by weight of glycidyl methacrylate and 0 to 20% by weight of acrylic acid and/or methacrylic acid, the sum of the monomer units being in all cases 100%. A mixture composed of 15 to 80% by weight of methyl methacrylate, 15 to 50% by weight of n-butylacrylate, 0 to 15% by weight of hydroxyethyl methacrylate, 0 to 15% by weight of glycidyl methacrylate and 0 to 5% by weight of acrylic acid and/or methacrylic acid as monomer units is particularly preferred.

Dispersion A is prepared by emulsion polymerization in an aqueous medium at temperatures in the range of from 0° to 150° C., preferably from 20° to 100° C., especially from 40° to 90° C., optionally under pressure. Component (a) may be introduced, for example, as a 5 to 65% by weight aqueous system and then polymerized with the vinyl monomers (b) with the addition of a polymerization initiator and optionally other conventional additives such as emulsifiers and/or protective colloids as well as molecular weight regulators. The aqueous medium of the polymerization mixture may be derived from the aqueous systems of component (A) but as a general rule water is added to the reaction mixture to provide the best conditions for emulsion polymerization.

The polymerization may be carried out as described in DE-OS No. 2 811 913, U.S. Pat. No. 4,240,938.

Conventional auxiliary agents such as the usual polymerization initiators, emulsifiers and/or protective colloids and/or molecular weight regulators may be used for the polymerization.

The polymer or binder dispersions described above are basically self cross-linking but they may also be cross-linked by external agencies, e.g. by heating or stoving in the presence of cross-linking agents containing suitable functional groups.

A polyurethane dispersion is used as component (B) This is preferably anionic and preferably has an acid number of from 5 to 50, most preferably 10 to 30, based on its solids content. Preparation of this dispersion is normally carried out by chain lengthening of a prepolymer containing isocyanate end groups after neutralization of its acid groups and emulsification in water, optionally in the presence of polyamines and/or hydrazine. In this process. either all the isocyanate groups are reacted with diamines or, if higher polyamines or mixtures thereof are used, amine nitrogen atoms containing reactive hydrogen remain. This process gives rise to products with improved dispersability, i.e. the polyurethanes obtained can be dispersed in water with a comparatively small number of acid salt groups and form an organic phase consisting of fine particles.

Preparation of the prepolymer containing isocyanate groups may be carried out by the reaction of polyhydric alcohols having a hydroxyl number of 10 to 1800, preferably 50 to 500, with excess polyisocyanates at temperatures of up to 150° C., preferably 50° to 130° C., in organic solvents which are incapable of reacting with isocyanates. The equivalent ratio of NCO groups to OH groups is in the range of from 1.5 : 1.0 to 1.0 : 1.0 and preferably in the range of from 1.4 : 1 to 1.2 : 1. The polyols used for the preparation of the prepolymer may be of low molecular weight and/or high molecular weight and may contain relatively inert anionic groups.

Low molecular weight polyols give rise to a harder polyurethane than higher molecular weight polyols. Low molecular weight polyols have a molecular weight of from 60 to about 400 and may contain aliphatic, alicyclic or aromatic groups. They are used in quantities of up to 30% by weight of the total polyol components, preferably about 2 to 20% by weight. It is advantageous to use low molecular weight polyols which have up to about 20 carbon atoms per molecule, such as ethylene glycol, diethylene glycol, triethylene glycol, 1,2-propanediol, 1,3-propanediol, 1,4-butanediol, 1,2-butyleneglycol, 1,6-hexanediol, trimethylolpropane, castor oil or hydrogenated castor oil, di-trimethylolpropane ether, pentaerythritol, 1,2-cyclo- hexanediol, 1,4-cyclohexanedimethanol. bisphenol A, bisphenol F, neopentylglycol, hydroxypivalic acid neopentyl glycol ester, hydroxyethylated or hydroxypropylated bisphenol A. hydrogenated bisphenol A and mixtures thereof.

In order to obtain an isocyanate prepolymer with high flexibility, a high proportion of a relatively high molecular weight, predominantly straight chained polyol preferably having a hydroxyl number of from 30 to 150 should be added. Up to 97% by weight of the whole polyol may consist of saturated and unsaturated polyesters and/or polyethers having a molecular weight $\overline{M}n$ of from 400 to 5000. The high molecular weight polyols used may suitably be aliphatic polyether diols corresponding to the general formula n

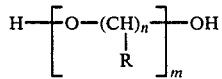

wherein R=hydrogen or a lower alkyl group optionally containing various substituents and n=2 to 6, preferably 3 to 4 and m=2 to 100, preferably 5 to 50. Examples include straight chained and branched olyether diols such as poly(oxyethylene) glycols. poly(oxypropylene) glycols and/or poly(oxybutylene) glycols. The polyether diols chosen should not introduce unduly large quantities of ether groups because the polymers formed then swell in water. The preferred polyether diols are poly(oxypropylene) glycols in the range of molecular weights $\overline{M}n$ of from 400 to 3000.

Polyester diols are prepared by the esterification of organic dicarboxylic acids or their anhydrides with organic diols or are derived from a hydroxycarboxylic acid or a lactone. For the preparation of branched polyester polyols, a small proportion of polyols or polycarboxylic acids of higher valency may be used. The dicarboxylic acids and diols may be straight chained or branched aliphatic,cycloaliphatic or aromatic dicarboxylic acids or diols.

The diols used for the preparation of the polyesters consist, for example, of alkylene glycols such as ethylene glycol, propylene glycol. butylene glycol, butanediol-(1.4), hexanediol-(1,6), neopentyl glycol and other diiols such as dimethylolcyclohexane although minor quantities of polyols such as trimethylolpropane, glycerol or pentaerythritol may also be used. The acid component of the polyester consists primarily of low molecular weight dicarboxylic acids or their anhydrides having 2 to 30. preferably 4 to 18 carbon atoms in the molecule. Suitable acids are, for example, o-phthalic acid, isophthalic acid, terephthalic acid, tetrahydrophthalic acid, cyclohexanedicarboxylic acid, succinic acid, adipic acid, azelaic acid, sebacic acid. maleic acid, fumaric acid, glutaric acid, hexachloroheptane dicarboxylic acid, tetrachlorophthalic acid and/or dimerised fatty acids. Instead of these acids, their anhydrides may be used where these exist. Minor quantities of carboxylic acids containing 3 or more carboxyl groups may be present in the formation of polyester polyols. e.g. trimellitic acid anhydride or the product of addition of maleic acid anhydride to unsaturated fatty acids.

Polyester diols obtained by the reaction of a lactone with a diol are also used according to the invention. They are distinguished by the presence of hydroxyl end groups and recurrent polyester units of the formula

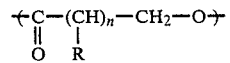

In the above formula, n preferably has a value from 4 to 6 and the substituent R is preferably hydrogen or an alkyl, cycloalkyl or alkoxy group.

No substituent contains more than 12 carbon atoms. The total number of carbon atoms in the substituents does not exceed 12 per lactone ring. Examples of these are hydroxycaproic acid, hydroxybutyric acid, hydroxydecanoic acid and/or hydroxystearic acid. The lactone used as starting material may be represented by the following general formula

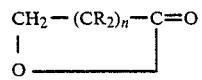

wherein n and R have the meanings already indicated.

Unsubstituted ε-caprolactone in which n has the value 4 and all the R-substituents are hydrogen is preferred for the preparation of the polyester diols. The reaction with lactone is started by low molecular weight polyols such as ethylene glycol, 1,3-propanediol, 1,4-butanediol or dimethylolcyclohexane although other reactants, such as ethylene diamine, alkyldialkanolamines or urea may also be reacted with caprolactone.

Polylactam diols obtained by the reaction of, for example, ε-caprolactam with low molecular weight diols are suitable relatively high molecular weight diols.

Typical multifunctional isocyanates used are aliphatic, cycloaliphatic and/or aromatic polyisocyanates having at least two isocyanate groups per molecule. The isomers or isomeric mixtures of organic diisocyanates are preferred. Suitable aromatic diisocyanates include phenylene diisocyanate, tolylene diisocyanate, xylylene diisocyanate, biphenylene diisocyanate, naphthylene diisocyanate and diphenylmethane diisocyanate.

Due to their resistance to ultraviolet light,(cyclo)-aliphatic diisocyanates give rise to products with little tendency to yellowing. Examples include isophorone diisocyanate, cyclopentylene diisocyanate and the hydrogenation products of aromatic diisocyanates such as cyclohexylene diisocyanate methyl cyclohexylene diisocyanate and dicyclohexylmethane diisocyanate. Aliphatic diisocyanates are compounds corresponding to the formula

O=C=N$\leftarrow$CR$_2$$\rightarrow$$_r$N=C=O wherein r denotes an integer from 2 to 20, in particular 6 to 8 and the substituents represented by R, which may be identical or different, are hydrogen or a lower alkyl group with 1 to 8 carbon atoms, preferably 1 or 2 carbon atoms. Examples include trimethylene diisocyanate, tetramethylene diisocyanate, pentamethylene diisocyanate. Hexamethylene diisocyanate, propylene diisocyanate, ethyl ethylene diisocyanate, dimethylethylene diisocyanate, methyl trimethylene diisocyanate and trimethylhexane diisocyanate. Particularly preferred diisocyanates are isophorone diisocyanate and dicyclohexylmethane diisocyanate. The polyisocyanate component used for the formation of the prepolymer may contain a proportion of higher valent polyisocyanates, provided they do not give rise to gel formation. Products obtained by the trimerisation or oligomerisation of diisocyanates or by the reaction of diisocyanates with polyfunctional compounds containing OH or NH groups have proved to be suitable triisocyanates. These include, for example, the biuret of hexamethylene diisocyanate and water, the isocyanurate of hexamethylene diisocyanate and the adduct of isophorone diisocyanate and trimethylolpropane.

The average functionality may be lowered if necessary by the addition of monoisocyanates. Examples of such chain breaking monoisocyanates are phenyl isocyanate, cyclohexyl isocyanate and stearyl isocyanate.

Polyurethanes are generally not compatible with water unless special constituents have been incorporated in their synthesis and/or special procedures have been adopted for their preparation. Thus in component B) such a high acid number is built in that the neutralized product can form a stable emulsion in water. The compounds used for this purpose may be compounds containing two isocyanate reactive H groups and at least one group capable of anion formation. Suitable isocyanate reactive groups are in particular hydroxyl groups and primary and/or secondary amino groups. Groups which are capable of anion formation include carboxyl groups, sulphonic acid groups and/or phosphonic acid groups. Carboxylic acid groups or carboxylate groups are preferably used. They should be so slow to react that the isocyanate groups of the diisocyanate preferentially react with the hydroxyl groups of the molecule. Alkanoic acid having two substituents on the α-carbon atom are used for this purpose. The substituent may be a hydroxyl group or an alkyl group or, preferably, an alkylol group. These polyols have at least one, generally 1 to 3 carboxyl groups in the molecule. They have from 2 to about 25, preferably 3 to 10 carbon atoms. Examples of such compounds are dihydroxypropionic acid, dihydroxysuccinic acid and dihydroxybenzoic acid. A particularly preferred group of dihydroxyalkanoic acids are the α,α-dimethylolalkanoic acids corresponding to the structural formula

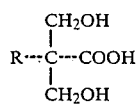

wherein R=hydrogen or an alkyl group with up to about 20 carbon atoms. Examples of such compounds are 2.2-dimethylol acetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Examples of compounds containing amino groups are αδ-diaminovaleric acid, 3,4-diaminobenzoic acid, 2,4-diaminotoluenesulphonic acid and 2,4-diaminodiphenylether sulphonic acid. The polyol containing carboxyl groups may constitute 3 to 100% by weight, preferably 5 to 50% by weight of the whole polyol component in the isocyanate prepolymer. This dihydroxyalkanoic acid is at least partly neutralized with a tertiary amine before the reaction with isocyanates in order to prevent a reaction with the isocyanates.

The quantity of ionizable carboxyl groups available as a result of the carboxyl group neutralization in the salt form

generally amounts to at least 0.4% by weight and is preferably at least 0.7% by weight, based on the solids content. The upper limit is about 6% by weight. The quantity of dihydroxyalkanoic acids in the unneutralized prepolymer results in an acid number of at least 5, preferably at least 10. The upper limit of the acid number is 60, prefer. ably 40, based on the solids content.

The isocyanate prepolymers used according to the invention may be prepared by the simultaneous reaction of the polyol or polyol mixture with a diisocyanate excess but the reaction may also be carried out stepwise in the prescribed sequence.

Examples are described in DE-No. 2 624 442 and DE-No. 3 210 051. The reaction temperature may be up to 150° C. and is preferably in the range of from 50° to 130° C. The reaction is continued until virtually all hydroxyl functions have been reacted.

The isocyanate prepolymer contain at least about 0.5% by weight of isocyanate groups, preferably at least 1% by weight of NCO, based on the solids content. The upper limit is about 15% by weight, preferably 10% by weight, most preferably 5% by weight.

The reaction may be carried out in the presence of a catalyst such as organo tin compounds and/or tertiary amines. Organic solvents which do not contain Zerewitinoff-active hydrogen atoms may be added in order to keep the reactants in a liquid state and enable better temperature control to be obtained during the reaction. Suitable solvents are, for example, dimethylformamide, esters, ethers such as diethylene glycol dimethylether, keto esters, ketones such as methyl ethyl ketone and acetone, ketones substituted with methoxy groups, such as methoxy hexanone, glycol ether esters, chlorinated hydrocarbons, aliphatic and alicyclic hydrocarbon pyrrolidones such as N-methylpyrrolidone, hydrogenated furans, aromatic hydrocarbons and mixtures thereof. The quantity of solvents may vary within wide limits and should be sufficient to result in a prepolymer solution with a suitable viscosity. From 0.01 to 15% by weight of solvent are generally sufficient, from 0.02 to 8% by weight of solvent being preferred, based on the solids content. If the solvents, which may be insoluble in water, boil at a lower temperature than water, they may be carefully distilled off by vacuum distillation or thin layer evaporation after preparation of the urea-containing polyurethane dispersion. Higher boiling solvents should be water-soluble and remain in the aqueous polyurethane dispersion to facilitate coalescence of the polymer particles during film formation. N-methylpyrrolidone is a particularly preferred solvent, optionally used as a mixture with ketones such as methyl ethyl ketone.

The anionic groups of the isocyanate prepolymer are at least partially neutralized with a tertiary amine. The resulting increase in dispersability in water is sufficient for infinite dilution. It is also sufficient for forming a stable dispersion of the neutralized urea-containing polyurethane. Examples of suitable tertiary amines include trimethylamine, triethylamine, dimethylamine, diethylamine and N-methylmorpholine. After neutralization, the isocyanate prepolymer is diluted with water and gives rise to a finely divided dispersion. Shortly thereafter, the isocyanate groups still present are reacted with di- and/or polyamines containing primary and/or secondary amino groups as chain lengthening agents. This reaction leads to further linkage and increase in the molecular weight. If optimum properties are to be obtained, the competing reaction between amine and water with the isocyanate must be suitably adjusted (time, temperature, concentration) and carefully monitored to ensure reproducible production. The chain lengthening agents used are preferably water-soluble compounds because these increase the dispersability of the polymeric end product in water. Organic diamines are preferred because they generally build up the greatest molecular weight without gelling the resin, but the ratio of amino groups to isocyanate groups must be suitably chosen if this is to be achieved. The quantity of chain lengthening agent is determined by its functionality, the isocyanate content of the prepolymer and the duration of the reaction. The ratio of reactive amino groups in the chain lengthening agent to isocyanate groups in the prepolymer should generally be less than 1:1 and is preferably in the range of from 1:1 to 0.75:1. The presence of excess active hydrogen, in particular in the form of primary amino groups, may result in polymers with an undesirably low molecular weight.

The polyamines substantially consist of alkylene polyamines having 1 to 40 carbon atoms, preferably about 2 to 15 carbon atoms. They may carry substituents which do not have isocyanate reactive hydrogen atoms Examples include polyamines having a straight chained or branched aliphatic, cycloaliphatic or aromatic structure and containing at least two primary amino groups. Suitable diamines are ethylene diamine, propylene diamine, 1,4-butylene diamine, piperazine, 1,4-cyclohexyldimethylamine, hexamethylenediamine-(1,6), trimethylhexamethylenediamine. methanediamine, isophorone diamine, 4,4'-diaminodicyclohexylmethane and aminoethyl ethanolamine. Alkyl and cycloalkyl diamines such as propylene diamine and 1-amino-3-aminomethyl-3,5,5-trimethylcyclohexane are preferred diamines.

Chain lengthening may be carried out at least partly with a polyamine having at least three amino groups with a reactive hydrogen. This type of polyamine may be used in such a quantity that unreacted amine nitrogen atoms having 1 or 2 reactive hydrogen atoms are present after the chain lengthening of the polymer. Polyamines suitable for this purpose include diethylene triamine, triethylene tetramine, dipropylene triamine and dibutylene triamine. Preferred polyamines are alkyl or cycloalkyl triamines such as diethylenetriamine. Diamines in which the primary amino groups are protected in the form of ketimines and which become reactive in the presence of water by splitting off of the ketone may also be used as chain lengthening agents. If the isocyanate content is very high, gelling during chain lengthening may be prevented by the addition of small proportions of monoamines such as ethyl hexyl-amine. As component (B) there may also be used a polyurethane dispersion which has been prepared as described above but to which radically polymerisable ethylenically unsaturated monomers have subsequently been added and which have then undergone further polymerization. The monomers capable of radical polymerization used may be, for example, monomers of the kind defined for component A)b). Polymerisation may be carried out by the slow addition of the polymers with the use of radical initiators. Polyurethane dispersions of this kind may be prepared, for example, as described in DE-B- No. 1 953 348 and in DE-A- No. 2 363 307.

A grinding resin and/or grinding auxiliary may be added as component C) to the aqueous coating compounds according to the invention. The grinding resins used may be, for example, polyester resins, amine-formaldehyde condensation resins such as melamine resins and/or acrylate resins.

Polyester resins for the purpose of this invention are capable of being dispersed in water after neutralization and may be either oil-free or oil-modified. They are obtained by the reaction of polyfunctional alcohols, polyfunctional carboxylic acids and optionally an oil or an oil-fatty acid at temperatures from 120° to 240° C. Their number average molecular weights range from 500 to 5000, their hydroxyl numbers from 0 to 200 and their acid numbers from 5 to 80, preferably from 20 to 50. The oils used are generally converted into the "monoglyceride" by alcoholysis before the reaction with the polycarboxylic acids. The physical properties may be widely varied by choice of the quantities and nature of the various components. The polyfunctional alcohols used are preferably straight chained or branched aliphatic, cycloaliphatic and/or araliphatic alcohols having 2 to 6, preferably 2 to 4 OH groups attached to non-aromatic carbon atoms and 2 to 24 carbon atoms per molecule. For the synthesis of oil-free polyesters it is preferred to use diols such as ethylene glycol, propylene glycol, butanediol-(1,4), neopentyl glycol, hexanediol-(1,6), pivalic acid neopentyl glycol ester, cyclohexane dimethanol, hydrogenated bisphenol A, hydroxyalkylated bisphenols, 4,4'-di-(hydroxymethyl) diphenylmethane, 1,3-di-(hydroxyethyl)-5,5-dimethyl-hydantoin, diethylene glycol, dipropylene glycol, polyether glycols such as poly (oxytetramethylene) glycol and 2,4-dihydroxypropane. The following are some examples of preferred diols: Propylene glycol, butanediol-(1.4), hexanediol-(1,6) and neopentyl glycol. The functionality may be increased by means of trivalent or higher valent polyhydric alcohols such as glycerol, trimethylolpropane, di-trimethylolpropane, pentaerythritol, di-pentaerythritol, trimethylolethane, 1,2,6-hexanetriol and tris-hydroxy-ethyl-isocyanurate as well as sugar alcohols such as mannitol, sorbitol or methyl glycoside. A proportion of chain breaking monoalcohols such as isodecyl alcohol, cyclohexanol, benzyl alcohol, hydrogenated abietic alcohol or alkoxy alkanols may be used, especially when tri- carboxylic acids are used. The choice of alcohol components depends inter alia on the amount of free hydroxyl groups desired, the quantity of monocarboxylic acids used and the desired solubility and dilutability.

The polyfunctional carboxylic acids used may be straight chained or branched aliphatic, cycloaliphatic and/or aromatic polybasic carboxylic acids, preferably di-, tri- and tetracarboxylic acids having 4 to 12 carbon atoms per molecule or esterifiable derivatives thereof (e.g. anhydrides or esters). Typical polycarboxylic acids are o-phthalic acid, iso- and terephthalic acid, tetra-and hexahydrophthalic acid, trimellitic acid, pyromellitic acid and, if these can be prepared, their anhydrides or esters with lower alcohols or glycols. The following may be used as aliphatic dicarboxylic acids: Maleic acid anhydride, fumaric acid, itaconic acid, acetylene dicarboxylic acid, succinic acid anhydride, adipic acid, azelaic acid, sebacic acid, the lower or higher homologues and their alkyl substituted derivatives. For the purpose of adjusting the functionality and hardness, the polyesters, which are optionally oil modified, may advantageously contain a small quantity of monobasic acid, such as benzoic acid, tert.-butylbenzoic acid, abietic acid or similar aromatic monobasic acids. Apart from trimellitic acid anhydride, the polycarboxylic acids used for the preparation of resins with higher acid numbers may also be adducts of maleic acid anhydride and unsaturated fatty acids or oils. Preferably at least a portion of the acid component contains an aliphatic dicarboxylic acid having a $C_4$ to $C_8$ hydrocarbon chain. Carboxylic acids containing hydroxyl groups, such as 5-hydroxypentane carboxylic acid or their lactone, dimethylolpropionic acid, hexahydrobenzoic acid or tartaric acid may also be used.

Oil-free polyesters are prepared predominantly with diols. Oil-modified polyesters or alkyl resins contain predominantly tri- or penta-alcohols as esterifying agents. The modification is carried out either with natural non-drying or drying oils or with the fatty acids prepared from the oils. The non-drying oils used for this purpose include coconut oil, cotton seed oil, ground nut oil, olive oil, castor oil and the like. Drying or semi-drying oils used are linseed oil, tall oil, soya bean oil, saffran oil, perilla oil, wood oil, oiticica oil, poppy seed oil, sunflower oil, herring oil and the like. These oils may be used as such or in the form of the corresponding oil fatty acids. Oils which do not tend to undergo yellowing in the film are preferred. The natural fatty acids may be catalytically isomerized, optionally in the form of their methyl esters. Preferred starting materials for alkyl resins are prepared by the dehydration of castor oil or ricinoleic fatty acid. Purely synthetic fatty acids, however, such as 2-ethylhexanoic acid or versatic acid may also be used, most preferably by way of the previously prepared glycidyl ester. The fatty acid content may be up to about 60% and is preferably 20 to 50%, depending on the desired properties.

To increase the dilutability in water, the resins may be directly reacted to a higher acid number or a relatively high molecular weight polyester containing OH groups is advantageously reacted with an acid anhydride, preferably a cycloaliphatic acid anhydride. A similar effect is obtained by the incorporation of trimellitic acid anhydride, the product of addition of maleic acid anhydride to isolated or conjugated unsaturated fatty acids, or dimethylol- propionic acid.

Polycondensation is carried out solvent-free or with the aid of solvents as an azeotropic process at reaction temperatures of from 150° to 240° C. When the desired properties have been obtained (viscosity, acid number), the reaction mixture is cooled to 100°–120° C. and diluted to a solids content of 60 to 90% by weight with glycol ethers or alcoholic solvents. The solids content depends on the viscosity of the solution obtained. The aim is to obtain a solution which is easily workable but has the highest possible solids content.

Amine-formaldehyde condensation resins which may be used as component (C) are obtained, for example, by the reaction of aldehyde with urea, N-alkylurea, dicyandiamide, various triazines such as melamine, benzoguanamine and acetoguanamine or mixtures thereof. The aldehydes may be monofunctional or polyfunctional. Examples are formaldehyde and its polymerization products such as para-formaldehyde, polyoxymethylene, trioxane and aliphatic and cyclic aldehydes such as glyoxal, acetaldehyde, acrolein, propionaldehyde, butyraldehyde and furfural. The resins obtained vary in their molecular weight and reactivity, depending on the reaction conditions (pH value, temperature) and degree of methylolation. Condensation with formaldehyde, furfural, paraformaldehyde, polyoxymethylene or trioxane is generally carried out with the addition of weak acids or bases as catalysts. Strong acids are used for condensation with acrolein, glyoxal, acetaldehyde, propionaldehyde or butyraldehyde. The primary reaction product is neutralized, aldehyde is then added, and the reaction is continued with the addition of weak acids or bases. The preferred aldehyde is formaldehyde. The alcohol groups of the aldehyde condensation products, preferably methylol groups, are partially or preferably completely etherified with alcohols. The amine formaldehyde resins used are preferably of a kind in which the major proportion of methylol groups is reacted with monohydric alcohols or mixtures thereof. Methanol, ethanol, propanol, butanol, heptanol, benzyl alcohol and other aromatic alcohols, cyclic alcohols and ethoxy ethanol or butoxy ethanol are particularly preferred. If alcohols having more than 4 carbon atoms are to be incorporated, the methylol group is first etherified with a lower alcohol and the higher alcohol is subsequently introduced by transetherification. The preferred alcohols are lower aliphatic monohydric alcohols such as methanol and/or butanol and its isomers. Melamine resins which are reacted with 3 to 6 mols of formaldehyde and then completely etherified with methanol are particularly preferred. The resins are prepared in accordance with the state of the art and supplied by many companies as sales products. Melamine resins containing carboxyl groups are obtained when etherification is carried out with hydroxycarboxylic acids such as hydroxybenzoic acid, salicylic acid or dimethylolpropionic acid whereas unsaturated melamine resins are obtained when hydroxyalkyl (meth)acrylates or allyl alcohol are used.

Examples of acrylate resins used as component C) include in particular poly(meth)acrylate resins having a number average molecular weight $\overline{M}n$ of from 10,000 to 500,000, in particular from 40,000 to 200,000 (determined by gel permeation chromatography, based on polystyrene). These resins preferably have a glass transition temperature of from $-50°$ to $+150°$ C. (in particular from $-15°$ to $+100°$ C, especially from $+20°$ to $+50°$ C, calculated from the glass transition temperatures of the homopolymers). The acid number is preferably 0 to 50 (Mg KOH per g of solid resin), in particular 10 to 30. The hydroxyl number is preferably from 60 to 250 (converted into mg KOH per g of solid resin), in particular from 80 to 200.

The viscosity of such poly(meth)acrylate resins is preferably from 5 to 100 Pa.s, in particular from 10 to 50 Pa.s, determined in a 50% solution in butoxyethanol at 25° C.

Poly(meth)acrylate resins of this kind may be prepared in water dilutable organic solvents at temperatures from 50° to 160° C. with the aid of radical catalysts without the use of emulsifiers, dispersion stabilizers and/or protective colloids. It is essential that a number average molecular weight which is high for solution polymerization should be reached as indicated above and as may also be recognized by the high viscosity of the solution. The number average molecular weight is determined by gel permeation photography and based on polystyrene. In solution polymerization, an increase in viscosity is normally obtained by reducing the quantity of catalyst so that the polymerization yield is incomplete due to the high solvent content and the stabilizers present in the monomers. A better solution lies in using a higher catalyst content and adding polyunsaturated monomers. The latter may be replaced by monomers containing reactive groups which can react with each other during polymerization to give rise to the polyunsaturated monomer "in situ". By suitable choice of the acid numbers and hydroxyl numbers, hydrophilic groups are introduced into the molecule in such quantities that after neutralization with basic compounds it can be diluted with water to a solids content of from 15 to 45% by weight. A high hydroxyl number is required for an acrylate resin having a low acid number and conversely. Thus, for example, a water-dilutable product may be prepared with an acid number of 20 and a hydroxyl number of 150.

The composition of polymer resin or poly(meth)acrylate resin (component C)) preferably consists of
a. 0 to 12% by weight of $\alpha,\beta$-unsaturated carboxylic acids,
b. 10 to 65% by weight of ethylenically monounsaturated monomers containing hydroxyl groups,
c. 0.1 to 7% by weight of ethylenically polyunsaturated monomers and
d. 16 to 90% by weight of ethylenically monounsaturated monomers not containing any further reactive groups.

The ethylenically unsaturated monomers may be virtually any radically polymerisable monomers but the usual restrictions for copolymerisations apply as laid down by the Q- and e-scheme of Alfrey and Price and the copolymerization parameters (see e.g. Brandrup and Immergut, Polymer Handbook, 2nd ed. John Wiley and Sons, New York (1975)).

The $\alpha,\beta$-unsaturated carboxylic acids used may be monomers of the general formula $$R-CH=CR'-COOH$$

wherein
$R=H$, COOH, $C_nH_{2n+1}$ or $COOC_nH_{2n+1}$,
$R'=H$ or $C_nH_{2n+1}$ and
$n=1$ to 6.

Examples of these are acrylic acid, methacrylic acid, crotonic acid, fumaric acid, maleic acid monoalkylesters and itaconic acid monoalkylesters. Acrylic acid and meth- acrylic acid are preferred.

By "hydroxyl group-containing monomers capable of being incorporated by polymerization" are meant monomers which in addition to a polymerisable, ethylenically unsaturated group contain at least one hydroxyl group on a $C_2$ to $C_{20}$ carbon structure. These are mainly unsaturated esterification products corresponding to the general formula $$R''-CH=CR'-X-R'''$$

wherein R' has the meaning defined above,
$R''=R'$ or $COOC_nH_{2n+1}$
$n=1$ to 6,
$R'''=$ a straight chained or branched $C_1$-$C_6$-alkyl group with 1 to 3 OH groups and
$X=COO$, CONH, $CH_2O$ or 0.

Particularly suitable are (meth)acrylic acid hydroxyalkyl esters such as $\beta$-hydroxyethylacrylate, $\beta$-hydroxypropylmeth-acrylate, butane-1,4-diol monoacrylate, propylene glycol monoacrylate, 2.3-dihydroxypropylmethacrylate, pentaerythritol monomethacrylate and polypropylene glycol monoacrylate as well as fumaric acid dihydroxyalkylesters whose straight chained, branched or cyclic alkyl group contains 2 to 20 carbon atoms, but N-hydroxylalkyl-(meth)acrylamides or N-hydroxyalkyl-fumaric acid mono- or diamides such as N-hydroxyethyl-acrylamide or N-(2-hydroxypropyl)-methacrylamide may also be used. Exceptionally elastic properties are obtained when a reaction product of hydroxy- alkyl-(meth)acrylate with c-caprolactone is used. Other suitable hydroxyl-containing compounds include allyl alcohol, monovinylethers of polyols, especially diols, such as monovinylethers of ethylene glycol and butanediol, and hydroxyl group-containing allyl ethers or esters such as 2,3-dihydroxypropyl-monoallylether, trimethylol-propane monoallylether or 2,3-dihydroxypropanoic acid allyl ester. Hydroxyethyl(-meth)acrylates are particularly suitable.

The hydroxyl groups may also be incorporated by the reaction of copolymers containing carboxyl groups with alkylene oxides such as ethylene oxide, propylene oxide or butylene oxide.

By "ethylenically polyunsaturated monomers" are meant compounds having at least two radically polymerisable double bonds as represented by the general formula $$R-CH=CR'-A-(-CR'=CH-R)_m$$
wherein $m=1$ to 3, preferably $m=1$.

In this formula, in addition to the meanings already given above, A represents the general, basic chemical structure for the reactive double bond. Examples of A are the o-, m- and p-phenyl group and groups of the formula X-alkyl-X' wherein the alkyl group preferably has 2 to 18 carbon atoms and X and X' may be identical or different linking groups, e.g. —O—, —CONH—, —COO—, —NHCOO— or NH—CO—NH—. The symbol A may denote, for example, a benzene ring as in divinylbenzene and may be substituted, as in p-methyl-divinylbenzene or o-nonyldivinylbenzene.

Other suitable monomers include the reaction products of polyhydric alcohols, especially dihydric alcohols, with $\alpha,\beta$-unsaturated carboxylic acids, as already defined above. The following are specific examples: Ethanediol diacrylate, ethylene glycol dimethacrylate, 1,4-butanediol diacrylate, 1,6-hexanedioldiacrylate, neopentyl glycol dimethacrylate, triethylene glycol dimethacrylate, poly- glycol-400-diacrylate, glycerol dimethacrylate, trimethylolpropanetriacrylate and/or pentaerythritol diacrylate. Polyfunctional monomers containing urethane and amide groups are prepared by the reaction of, for example, hexanediisocyanate or methacrylic acid $\beta$-isocyanatoethyl ester with hydroxyethyl(meth)acrylate or (meth)acrylic acid. Examples of suitable compounds having a different structure are allyl methacrylate, diallylphthalate, butane-diol divinylether, divinylethylene urea, divinyl propylene urea, maleic acid diallylester, bis-maleic imides, glyoxa-bis-acrylamide and/or the reaction product of an epoxy resin with (meth)acrylic acid or fumaric acid semiesters. The use of difunctional unsaturated monomers such as butanediol diacrylate or hexanediol diacrylate is preferred. When glycidyl methacrylate and methacrylic acid are used, the corresponding glycerodimethacrylate is automatically formed in the process of polymerization..The nature and quantity of polyunsaturated monomers should be carefully adjusted according to the reaction conditions (catalysts, reaction temperature, solvent) so that the desired high viscosity may be obtained without gel formation.

The choice of unsaturated monomers containing no further reactive groups is made according to the mechanical properties and compatibility characteristics. Acrylic acid alkyl esters, methacrylic acid alkyl esters and/or dialkylesters of maleic or fumaric acid are used, the alkyl groups having 1 to 20 carbon atoms and being arranged in a straight or branched aliphatic chain and/or as a cycloaliphatic and/or (alkyl)aromatic group. Examples of "hard" monomers which have a high glass transition temperature as polymers include monomers of the aromatic vinyl type such as styrene, $\alpha$-substituted styrenes such as o-methylstyrene, o-, m- and p-alkylstyrenes such as vinyl toluene or p-tert.-butylstyrene, halogenated vinyl benzenes such as o- or p-chlorostyrene, short chained methacrylic acid esters such as methyl methacrylate, ethyl methacrylate, propylmethacrylate or butylmethacrylate, cyclohexylmethacrylate, isobornylmethacrylate, dihydro. dicyclopentadienyl methacrylate, acrylamide and acrylonitrile. "Soft" monomers, on the other hand, include acrylic acid esters which have a long alcohol chain, such as n-butylacrylate, isobutyla-crylate, tert.- butyl- acrylate and/or 2-ethylhexylacrylate. Unsaturated ethers such as ethoxyethylmethacrylate or tetrahydrofurfurylacrylate may also be used. A proportion of monomers of the vinyl ester type, especially vinyl esters, may also be used if suitable reaction conditions are maintained. Preferred monomer combinations consist, for example, of acrylate and/or methacrylate monomers, (meth)- acrylic acid or hydroxyalkyl(meth)acrylic acid esters as mono-olefinically unsaturated compounds and divinyl-benzene, butanediol-diacrylate or hexanedioldiacrylate as multi-unsaturated compounds.

Copolymerization is carried out in known manner by solution polymerization with the addition of radical initiators and optionally molecular weight regulators. It is carried out in a liquid which serves as solvent for the monomer and keeps the resulting polymer in a state of solution. The monomer or polymer content is about 30 to 70% by weight. Solution polymerization in organic solvents which can be diluted with water is preferred. The following are examples of such solvents: Ethylene glycol, ethoxyethanol, butoxyethanol, diethylene- glycol, triethylene glycol, diethylene glycol dimethylether, propylene glycol, methoxypropanol, ethoxyethanol, dipropyl- ene glycol monomethylether, dipropylene glycol dimethylether, diacetone alcohol, ethanol, isopropanol, n-butanol, sec.-butanol, tert.-butanol, acetone, methoxypropane, dioxane, tetrahydrofuran, N-methylpyrrolidone and mixtures thereof. A proportion of water-insoluble, high boiling solvent such as hexylene glycol, phenoxyethanol or 2,2,4-trimethyl- pentanediol-1,3-monoisobutyrate may be added to improve levelling. The solvent or solvent mixture is generally heated to the reaction temperature and the monomer mixture is then run in over a period of several hours. In order that reflux temperature may be employed, the initiator is adjusted to the boiling temperature of the solvent mixture. It normally decomposes with a half life of 30 minutes to 10 hours. The initiator is either dissolved cold in the monomer mixture or for safety reasons it is added separately during the inflow of monomer. Peroxides and/or azo compounds are added in quantities of 0.1 to 5% by weight, preferably 0.5 to 3% by weight, based on the quantity of monomer, to serve as catalysts which are soluble in organic solvents. The peroxides used may be, for example, benzoyl peroxide or di-tert.-butyl peroxide, hydroperoxides such as tert.-butyl hydroperoxide or cumene hydroperoxide, or peresters such as tert.-butylperoctoate or tert.-butyl perbenzoate. Examples of azo compounds which are decomposed by heat include 2,2'-azo-bis-(2-cyanopropane),1,1'-azo-bis-cyclohexane carbonitrile and 4,4'-azo-bis-(4-cyanopentanoic acid). The molecular weight may be reduced in known manner by the addition regulators. These are preferably mercaptans, halogenated compounds and other radical-transferring substances. Particularly preferred molecular weight regulators are n- and tert.-dodecylmercaptan, tetrakis- mercaptoacetylpentaerythritol, tert.-butyl-o- thiocresol, thiosalicyclic acid, mercaptoacetic acid, buten-1-ol and dimeric $\alpha$-methulstyrene.

To convert the poly(meth)acrylate resin which is free from emulsifier into an aqueous solution or dispersion, the carboxyl groups are neutralized and the resin is then diluted with water. The neutralizing agents used may be ammonia, primary, secondary or tertiary alkylamines or alkanolamines or aminoethers or quaternary ammonium hydroxides. Specific examples of these are diethylamine, triethylamine, propylamine, butylamine, dimethylaminoethanol, diisopropanolamine, triethanolamine, triisopropanolamine, 2-amino-2-methyl-1-propanol, 2-dimethylamino-2- methylpropanol-1, morpholine and methylmorpholine. The choice of amine-neutralizing agent affects the stability of the aqueous dispersion and must be tested accordingly. Ammonia, triethylamine, dimethylaminoethanol and N-methylmorpholine are preferred on account of their ready volatility. The upper limit of the quantity of amine added is determined by the 100% degree of neutralization of the carboxyl groups present. The lower limit is determined by the stability of the dispersion prepared. The pH of the neutralized coating compound should be about 6.5 to 9.0. If the pH is too low, difficulties occur in the process of dispersion and the resin precipitates. Low boiling solvents may be removed by distillation at normal pressure or under vacuum after neutralization and dilution with water.

The grinding resins C used may also be copolymers obtainable by the reaction of
(A) 80 to 95% by weight of a copolymer of
 (a) 0.5 to 40% by weight of N,N-di-$C_1$ to 4-alkylamino-$C_{1\ to\ 8}$-alkyl(meth)acrylamides and/or a mixture of N,N-di-$C_{1\ to\ 4}$-alkylamino-$C_{1\ to\ 8}$-alkyl(meth)-acrulates and N-substituted (meth)acrylamides and/or (meth)acrylamide, in which the ratio of amino(meth)-acrylates to amido(meth)acrylates should be in the range of from 1:2 to 2:1,
 (b) 10 to 40% by weight of hydroxy-$C_{2-8}$-alkyl(meth)acrylates and
 (c) 20 to 89.5% by weight of copolymerisable, $\alpha,\beta$-olefinically unsaturated compounds and
(B) 5 to 20% by weight of a polyisocyanate containing unmasked and optionally also masked isocyanate groups and containing biuret, urethane or isocyanurate groups.

These resins are described in the Patent Application filed by the present Applicant on the same Application date under title "Pigment dispersion and its use", U.S. Ser. No. 86,931, filed Aug. 18, 1987.

When preparing the aqueous coating compounds according to the invention, components (A) and (B) and pigments, conventional auxiliary agents and additives and solvents may be mixed together in any sequence. After neutralization, for example with ammonia, amines and/or amino alcohols, the compounds are diluted to the required concentration with water. Coloring pigments are preferably ground up with the grinding resin (component C) optionally used and are then mixed with components (A) and (B) and further auxiliary agents and additives in any desired sequence. Metallic or non-metallic effect pigments (e.g. interference pigments) may be added at any stage but they are not ground up with the grinding resin. They may, for example, be mixed with component (A) and/or B) and then added to the other components in any sequence.

As already mentioned, a variety of pigments, namely coloring pigments on an inorganic basis ranging, for example, from titanium dioxide to iron oxide to carbon blacks but also others on an organic basis such as vat dyes, quinacridones, perylenes and phthalocyanines as well as conventional metal pigments (e.g. commercially available aluminum bronzes or refined steel bronzes) and non-metallic effect pigments (e.g. pearly lustre or interference pigments) may be incorporated in the aqueous coating compounds according to the invention. The coating compounds according to the invention are particularly suitable for the incorporation of such metal pigments or effect pigments as they have a positive effect on the alignment of the metal or effect pigments. The level of pigmentation lies in the usual ranges.

The usual inorganic or organic additives for adjusting the flow properties may be added to the coating compounds according to the invention. Thus suitable thickeners are, for example, water-soluble cellulose ethers such as hydroxyethylcellulose, methyl cellulose or carboxy methyl cellulose and synthetic polymers containing ionic and/or associatively acting groups, such as polyvinyl alcohol, poly(meth)acrylamide, poly(meth)acrylic acid, polyvinyl pyrrolidone, styrene/maleic acid anhydride and ethylene/maleic acid anhydride copolymers and derivatives thereof as well as hydrophobically modified ethoxylated urethanes or polyacrylates. Polyacrylate copolymers containing carboxyl groups and having an acid number of from 60 to 780, preferably from 200 to 500 are particularly preferred; these may also be used for wetting the metal effect pigments.

Solvents and neutralizing agents, for example of the kind described above for the poly(meth)acrylate resins, may be added to the coating compounds according to the invention to correct the flow properties and the pH and improve the storage stability.

The coating compounds according to the invention generally have a solids content of about 15 to 50% by weight. The solids content varies with the purpose for which the coating compound is intended. For metallic lacquers, for example, it is preferably in the region of 17 to 25% by weight but for uniformly coloured lacquers it is higher, for example 30 to 45% by weight.

The coating compounds according to the invention may in addition contain conventional organic solvents but their proportion is kept as low as possible, for example below 15% by weight.

The aqueous coating compounds according to the invention may be cured at low temperatures, optionally with the aid of external cross-linking agents. The usual cross-linking agents may be used for this purpose; for example, formaldehyde condensation products such as melamine resins and/or blocked isocyanates. Specific examples of formaldehyde condensation products are those described above for the grinding resins. When such a grinding resin is used, it may itself act as external cross-linking agent. Curing may also take place after the coating compound has been covered with a conventional clear lacquer which may be applied after the coating compound has been pre-dried but is preferably applied wet in wet. When two-component clear lacquers are used (e.g. acrylic-isocyanate and/or polyester-isocyanate), exceptionally advantageous properties of water resistance, resistance to stone chipping, adherence and weathering stability are obtained even at low curing temperatures. These curing temperatures may be, for example, in the region of 80° to 130° C. Temperatures above 120° C. are preferred for a one-component clear lacquer.

The coatings obtained from the coating compounds according to the invention preferably have a dry film thickness of from 10 to 25 $\mu$m but a thickness of 30 to 60 $\mu$m is preferably obtained when a clear lacquer is used in addition. According to the invention, the clear top coat lacquers used are preferably "high solids" lacquers. The application of a clear lacquer is not essential but is particularly advantageous in the motor vehicle industry.

Due to the use of binders which have not undergone preliminary cross-linking, the coating compounds according to the invention have good levelling properties which result in smooth surfaces. In addition, the bronze alignment in metallic lacquers is improved. The water resistance of the coatings obtained is excellent. When the coatings are used in the motor vehicle sector, excellent resistance to stone chipping is achieved.

EXAMPLES

Example of preparation 1

Preparation of Component A 100 g of an anhydride mixture (acid number/H$_2$O-486) prepared by the reaction of trimellitic acid anhydride and propane-1,2-diol and thus consisting of trimellitic acid anhydride and anhydrides corresponding to the following formula I and II

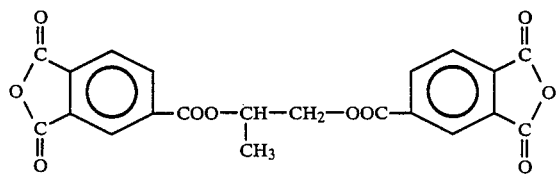

(I)

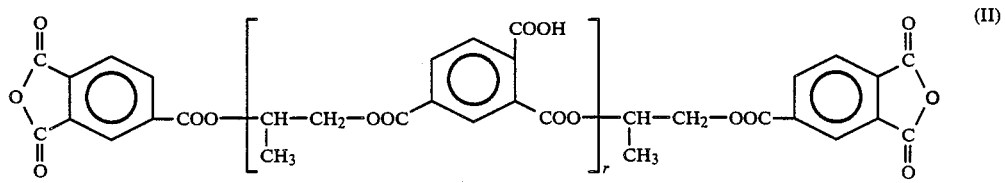

(II)

r = 1-8 which had been homogenized in 108 g of xylene at 50° C. were added dropwise within one hour to a solution in 70 g of methyl ethyl ketone of 141 g of a polyester (OH number 88) prepared on the basis of phthalic acid anhydride, isophthalic acid, maleic acid anhydride, propanediol and glycerol as described in DE-OS No. 2 811 913. Stirring was continued at 90° C. until the reaction mixture had an acid number in water of 165 (100% resin). 12 g of water were then added and an acid number in butanol of 168 (100% resin) was obtained after 6 hours' stirring at 80° to 90° C. The temperature of the mixture was lowered to 60° C. and 132 g of an epoxidized linseed oil (epoxide number 8.7) were added dropwise within 2 hours after the addition of 0.3 g of lithium benzoate and the mixture was stirred until the acid number in butanol had fallen to 86.5. A mixture of 42 g of dimethylamine (60% in water) in 860 g of water was then stirred in. A pale yellow, opalescent solution was obtained, from which the organic solvent was distilled off at 0.1 bar and 40° C. A yellowish, virtually clear aqueous resin solution was obtained after filtration.

Solids content: about 32% 91 hour at 125° C).

705 g of the aqueous (32%) dispersion described above and 196 g of water were introduced into a reactor equipped with stirrer, reflux condenser, internal thermometer and dosing device for the monomers and for the initiator. The mixture was heated to 80° C. with stirring and a solution of 0.5 g of ammonium peroxy disulphate in 35 g of water was added. 35 g of a monomer mixture of 125 g of methyl methacylate, 94 g of n-butylacrylate and 17 g of glycidyl methacrylate were added 5 minutes after addition of the initiator, and the remaining quantity of monomer was added over a period of 2 hours after a further 15 minutes of prepolymerization. 10 minutes after all the monomer had been added, a further 0.2 g of ammonium peroxydi-sulphate dissolved in 10 g of water was added within 10 minutes and the reaction mixture was then stirred for 2 hours at 80° C. for complete conversion. A stable, aqueous dispersion having solids content of about 40% was obtained.

Example of Preparation 2

Aqueous polyurethane dispersion B 250 g of a straight chained polyester (synthesized from adipic acid, isophthalic acid and hexanediol; OH number 77, acid number 10) were heated to 80° C together with 80 g of methyl ethyl ketone and 53.3 g of N-methyl-pyrrolidone in a reaction vessel equipped with stirrer, internal thermometer, heating means and reflux condenser, and 74 g of hydrogenated bisphenol A and 28.3 g of dimethylolpropionic acid were added at this temperature. The reaction mixture was heated to 120° C. and stirred at this temperature for half an hour. 146.7 g of hexamethylene diisocyanate were then added at 70° C. After an exothermic phase (temperature <90° C.), the reaction mixture was kept at 75° C. until the residual isocyanate number was less than 1.8. The resin mixture was dispersed while still hot in 891 g of deionized water and 23.5 g of tri-ethylamine with vigorous stirring. 5 Minutes after all the resin had been added. 10.5 g of propylenediamine.(1.3) in 75 g of deionized water were added and the reaction mixture was stirred for one hour.

A translucent, aqueous dispersion having the following characteristics was obtained:

| | |
|---|---|
| Solids content: | 30% |
| Viscosity (20° C.): | 109 mPa.s |
| pH: | 9.8 |
| Acid number: | 27 (mg KOH per g of solid resin). |

Preparation of component C1

912 g of butoxyethanol are heated to 130° C. under an inert gas atmosphere in a three-necked flask with reflux condensation and a mixture of 60 g of acrylic acid
165 g of hydroxyethylacrylate
145 g of n-butylacrylate
60 g of isobutylacrylate
550 g of methylmethacrylate
20 g of butanediol diacrylate and
6 g of tert.-butylperoxy-2-ethylhexanoate is slowly added from a dropping funnel over a period of 3 hours with vigorous stirring while the reaction temperature is maintained at 130° C. The reaction if after-initiated twice with tert.-butylperoxy-2-ethylhexanoate at an interval of 2 hours and the resin is then polymerized to completion.

Final values:

| Final values: | |
|---|---|
| Solids content: | 50.4% by weight (30 minutes' heating to 180° C.) |
| Acid number: | 48 mg KOH per g of solid resin |
| Viscosity: | 21 Pa.s at solids content |

Preparation of component C2

Method of preparation as for C1 but at 120° C., using the following composition:
1927 g of butoxyethanol
92 g of methacrylic acid
331 g of hydroxypropyl acrylate
462 g of isobutylacrylate
1134 g of methylmethacrylate
34 g of hexanediol diacrylate and
14 g of tert.-butyl-peroxy-2-ethoxyhexanoate.

| Final values: | |
|---|---|
| Solids content: | 51.6% by weight |
| Acid number: | 29 mg KOH per g of solid resin |
| Viscosity: | 29 Pa.s at solids content (30 min 180° C.) |

EXAMPLE OF PREPARATOIN 1

Preparation of a binder solution:
50.00 parts by weight of the water dilutable binder previously described under the heading of Preparation of component A are mixed with
43.94 parts by weight of completely desalted water and
6.00 parts by weight of butoxy ethanol and adjusted to pH 6.2–6.4 with
0.06 parts by weight of N-dimethylaminoethanol.

EXAMPLE OF PREPARATION 2

Preparation of an aluminum paste
20.50 parts by weight of a commercial aluminum paste having a metal content of 65% are vigorously stirred together with a mixture of
7.00 parts by weight of butoxyethanol and
14.00 parts by weight of completely desalted water, and a mixture of
10.00 parts by weight of the binder described above under the heading of Preparation of component A,
10.00 parts by weight of butoxyethanol,
34.70 parts by weight of completely desalted water and
3.00 parts by weight of a commercial acid acrylate thickener is added.
The pH is adjusted to 6.2–6.4 with a mixture of
0.08 parts by weight of N-dimethylaminoethanol and
0.72 parts by weight of completely desalted water.

EXAMPLE OF PREPARATION 3

Preparation of a blue pigment triturate:
10.00 parts by weight of Cu-phthalocyanine pigment in
17.00 parts by weight of a commercial hexamethoxy melamine resin and
10.00 parts by weight of butoxyethanol are predispersed by means of a dissolver and then completely dispersed in a pearyl mill after the addition of a further
5.00 parts by weight of the melamine resin and
10.00 parts by weight of butoxyethanol. A mixture of
0.90 parts by weight of a commercial acid acrylate thickener and
18.91 parts by weight of completely desalted water are then added and the pH is adjusted to 7.1–7.3 with
2.00 parts by weight of N-dimethylaminoethanol and
26.19 parts by weight of completely desalted water.

EXAMPLE OF PREPARATION 4

Preparation of a green pigment triturate:
10.00 parts by weight of a chlorinated phthalocyanine pigment are predispersed in a mixture of
20.00 parts by weight of the binder described above under the heading of Preparation of component C,
35.00 parts by weight of butoxyethanol and
0.50 parts by weight of N-dimethylaminoethanol by means of a dissolver and then completely dispersed in a pearl mill. The mixture is then diluted with
34.50 parts by weight of completely desalted water.

EXAMPLE 1

1.1 Preparation of a water-dilutable blue metallic base lacquer:
60.00 Parts by weight of the binder solution described in Example of preparation 1 are stirred together with
19.00 parts by weight of the aluminum paste described in Example of preparation 2,
1.90 parts by weight of acid acrylate thickener (as used above)
8.94 parts by weight of completely desalted water and
0.26 parts by weight of N-dimethylaminoethanol for a period of 30 minutes.
4.00 Parts by weight of the polyurethane dispersion described under the heading of Preparation of component B are stirred into this mixture and the pigment triturate described in Example of preparation 3 is added in a quantity of
0.94 parts by weight.
4.00 Parts by weight of n-butanol are then added with stirring and the mixture is adjusted to a viscosity of 90–95 mPa.s at 100 sec$^{-1}$ with
0.96 parts by weight of water. Solids content: 17.0% by weight (120 minutes in a circulating air drying oven at 120° C.)

1.2 Application of the basic lacquer and of a clear lacquer.

The basic lacquer described in 1.1 is applied by means of a spray gun atomizing under compressed air to a metal sheet which has been pretreated in the usual manner by zinc phosphatization and application of an electro dip lacquer and spray primer, a total dry film thickness of 15 μm being obtained in two applications of the base lacquer. The base lacquer is applied at an ambient temperature of 23° C. and relative humidity of 60%. After application, the coated sheet is force dried at 50° C. for 5 minutes in a circulating air drying oven and after cooling to 23° C. it is coated in the usual manner with a commercial acrylicmelamine resin clear lacquer and stoved for 30 minutes at 130° C.

A uniform coating free from cloudiness and with an excellent metallic effect and very high gloss is obtained.

EXAMPLE 2

2.1 Preparation of a water dilutable, silver coloured metallic base lacquer

A silver coloured base lacquer is prepared by a method analogous to that of Example 1.1 from 60.00 parts by weight of the binder solution described in Example of preparation 1.

19.00 parts by weight of the aluminum paste described in Example of preparation 2, 1.90 parts by weight of acid acrylate thickener, 0.26 parts by weight of N-dimethylaminoethanol, 5.00 parts by weight of polyurethane dispersion (according to the method of preparation of component B), 4.00 parts by weight of n-butanol and 9.84 parts by weight of completely desalted water.

The solids content is 16.8% by weight (120 minutes in a circulating air drying oven at 120° C).

The viscosity is 90–95 mPa.s at 100 sec$^{-1}$. 2.2 Application of the base lacquer and of a clear lacquer. A pretreated metal sheet is coated with base lacquer as described in Example 1.2 and force dried for 5 minutes at 50° C. as also described in Example 1.2. After cooling, the sheet is coated with a commercial two-component acrylic-isocyanate clear lacquer and stoved for 30 minutes at 130° C.

The coating obtained is distinguished by high brilliance, absolutely uniform effect formation free from cloudiness and a pronounced metallic effect.

EXAMPLE 3

3.1 Preparation of a water-dilutable green metallic base lacquer

The base lacquer is prepared by a method analogous to that of Example 1.1 from 59.00 parts by weight of the binder solution according to Example of preparation 1.

18.50 parts by weight of the aluminum paste according to Example of preparation 2, 1.90 parts by weight of acid acrylate thickener, 0.26 parts by weight of N-dimethylaminoethanol, 6.00 parts by weight of polyurethane dispersion according to the method of preparation of component B, 1.20 parts by weight of the green pigment triturate described in Example of preparation 4, 4.00 parts by weight of n-butanol and 9.14 parts by weight of completely desalted water.

Solids content: 17.1% by weight (120 minutes in circulating air oven at 120° C.)

Viscosity: 90–95 mPa.s at 100 sec$^{-1}$.

3.2 Application of the base lacquer and of a clear lacquer. As described in Example 1.2, the base lacquer described under 3.1 is applied to a pretreated metal sheet and after forced drying is coated with a commercial acrylic-melamine clear lacquer and stoved for 30 minutes at 130° C. A green metallic coating which has the same advantageous properties as in Examples 1.2 and 2.2 is obtained.

What is claimed is:

1. An aqueous coating composition containing a film-forming material based on an aqueous dispersion of water dilutable binders comprising a mixture of
   (A) 50 to 95% by weight of an emulsion polymerization reaction product of
       (a) 5 to 95% by weight of a carboxyl functional polycondensate containing, in addition, epoxy groups,
       (b) 95 to 5% by weight of at least one free radically polymerizable α,β-olefinically unsaturated monomer, and
       (c) 0 to 20% by weight of conventional auxiliary emulsifying agents and initiators for the preparation of polymers, the quantities indicated for components (a) to (c) being based on the solids content of component A and their sum in all cases being 100% by weight;
   (B) 50 to 5% by weight of an aqueous polyurethane dispersion; and
   (C) 0 to 20% by weight of a conventional grinding resin and/or conventional grinding agent;
   the proportions of (A) (B) and (C) being based on the solids content and adding up to 100% and pigments and optionally solvents, auxiliary agents and additives.

2. An aqueous coating composition according to claim 1, wherein component B is a polyurethane dispersion containing urea groups.

3. An aqueous coating composition according to claim 1 or 2, characterized in that component (A)(c) comprises the group consisting of anionic, non-ionic emulsifiers and/or protective colloids.

4. An aqueous coating composition according to claim 1, wherein the grinding resins are selected from the group consisting of melamine resins, polyester resins and acrylate resins or mixtures thereof.

5. A composition according to claim 1 wherein component (A) (c) includes 0.01 to 10% by weight of monomer (b) of a free radical polymerization initiator.

6. A process for the preparation of a coating composition according to claim 1 containing metallic and/or nonmetallic effect pigments, which comprises mixing components (A) and (B) with a metallic and/or non-metallic effect pigment and optionally component (C) ground up with a colouring pigment.

7. A process for the preparation of a coating composition containing colouring pigment according to claim 1, wherein component (C) is ground up with a coloring pigment and mixed in the proportions indicated in claim 1 with components (A) and (B) in any sequence or with a mixture of (A) and (B).

8. A method of coating an object with comprises applying the coating composition of claim 1 to the object surface and cross-linking the same.

9. A process according to claim 7 wherein a metallic or non-metallic effect pigments are added to the coloring pigment.

10. A method according to claim 8 wherein a coating of clear lacquer is applied over the applied cross-linked coating.

* * * * *

UNITED STATES PATENT AND TRADEMARK OFFICE
CERTIFICATE OF CORRECTION

PATENT NO. : 4,851,460

DATED : July 25, 1989

INVENTOR(S) : Stranghoner et al.

It is certified that error appears in the above-identified patent and that said Letters Patent is hereby corrected as shown below:

Column 5, line 55, after formula, delete [n];

Column 21, line 34, after "OF", delete [PREPARATOIN] and insert

-- PREPARATION --.

Signed and Sealed this

Second Day of October, 1990

Attest:

HARRY F. MANBECK, JR.

*Attesting Officer*         *Commissioner of Patents and Trademarks*